E. S. LEHR.
SHOCK ABSORBER.
APPLICATION FILED NOV. 18, 1920
1,423,667.
Patented July 25, 1922
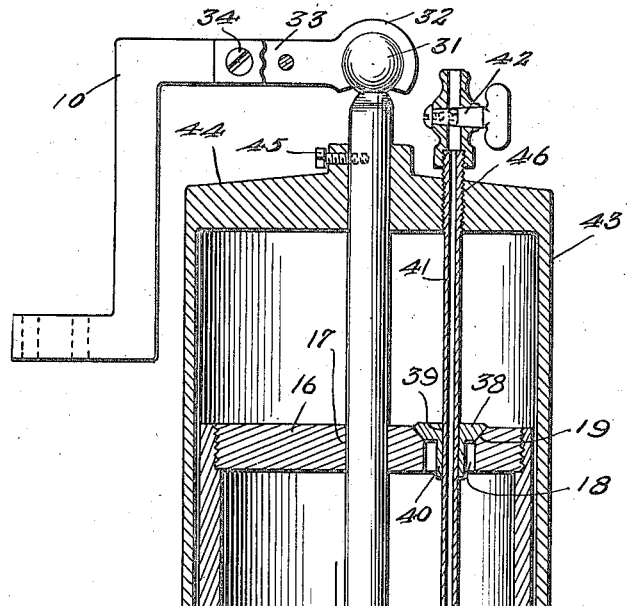
Fig. 1.
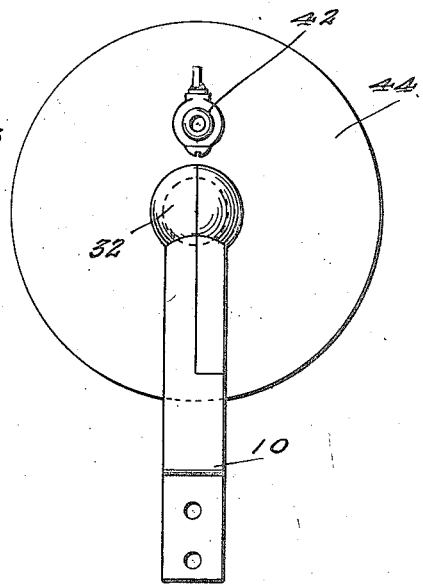
Fig. 2.
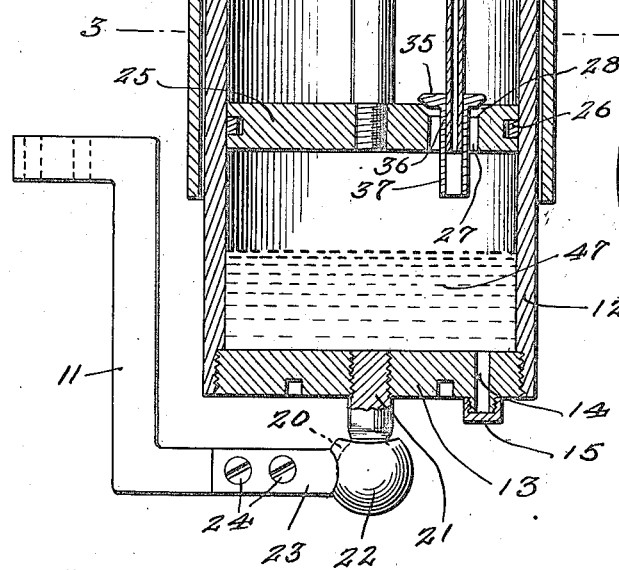
Fig. 3.
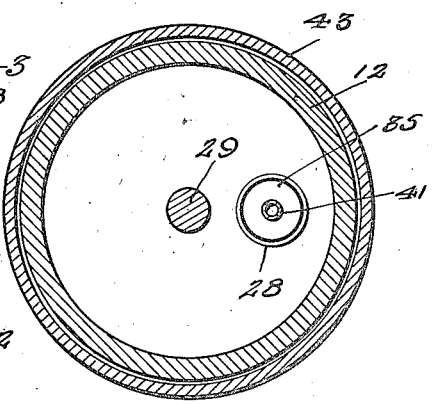
WITNESSES
P. G. Thomas
W. H. Buckley
E. S. Lehr   INVENTOR
BY Munn & Co.
ATTORNEYS

UNITED STATES PATENT OFFICE.

EMMETT SYLVESTER LEHR, OF SALT CREEK, WYOMING.

SHOCK ABSORBER.

1,423,667.  Specification of Letters Patent.  Patented July 25, 1922.

Application filed November 18, 1920. Serial No. 424,926.

*To all whom it may concern:*

Be it known that I, EMMETT SYLVESTER LEHR, a citizen of the United States, and a resident of Salt Creek, in the county of Natrona and State of Wyoming, have invented certain new and useful Improvements in Shock Absorbers, of which the following is a specification.

The present invention relates in general to spring suspension for vehicles, and more particularly to a shock absorber for spring suspensions.

The object of the invention is to provide a shock absorber of this character which is especially effective to dampen or cushion the rebound to thereby relieve the vehicle of sudden shocks and jars to preclude breakage of the parts of the running gear and associated structure and to give to the vehicle qualities of easy riding and of comfort.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a plan view of the invention;

Figure 2 is a transverse vertical sectional view thereof; and

Figure 3 is a transverse horizontal sectional view on line 3—3 of Figure 2.

Referring to the drawings wherein for the sake of illustration is shown the preferred embodiment of the invention, the numeral 10 designates a Z bracket adapted to be secured to the vehicle body or the like, and the numeral 11 designates a second Z-bracket adapted to be secured to the axle of the vehicle or the like.

A cylinder 12 is provided and has a lower cylinder head 13 provided with a vent opening 14 normally closed by a closure cap 15 and an upper cylinder head 16 having a central piston rod opening 17, and a second opening 18 having a valve seat 19 for a purpose to hereinafter more fully appear.

Means is provided for universally connecting the cylinder to the Z-bracket 11 and includes a ball 20 integrally formed at the lower end of a stud 21 which is secured to the lower cylinder head 13 and which is received in and cooperates with a socket 22 carried on an arm 23 secured by means of screws or similar fastenings 24 to an arm of the Z-bracket 11.

A piston 25 is mounted for reciprocatory movement in the cylinder 12 and is provided with piston rings 26 which bear against the inner wall of the cylinder to seal the piston. The piston is provided with an opening 27 therethrough having a valve seat 28 for a purpose to be hereinafter more fully described. A piston rod 29 is secured to the piston and extends through the opening 17 of the upper cylinder head to exteriorly of the cylinder.

Means is provided for universally connecting the piston rod to the bracket 10 and includes a ball 31 integrally formed or otherwise secured to the upper end of the piston rod 29 and received in and cooperating with a socket 32 carried by the bracket 11 and including a removable section 33 secured in assembly by fastening means 34.

A pressure operated valve 35 is arranged to cooperate with the valve seat 28 of the opening through the piston 25. The valve is provided with an opening 36 therethrough and an elongated tubular stem 37 is integrally formed with or otherwise secured to the valve and has its opening alined and communicating with the opening of the valve 35. The elongated tubular valve 37 is adapted to coact with the lower cylinder head 13 in the lowermost position of the piston to positively open the valve 35. A second pressure operated valve 38 is arranged to cooperate with the valve seat 19 of the opening through the upper piston head. The valve 38 also has an opening therethrough, indicated at 39, and is provided with a tubular stem 40 whose opening is alined with the opening in the valve 38. The valve 35 and the valve 38 are alined. A stand pipe 41 extends through the openings and tubular valve stems of the valves 35 and 38 and is adapted when desired to establish communication with the interior of the cylinder below the piston 25 and the atmosphere. A hand-cock 42 controls the stand pipe 41 and is effective to establish communication in various degrees or entirely shuts off communication as desired.

A cylindrical casing 43 having an upper closed end 44 is associated with the piston rod 29 at its upper end by means of a set screw 45 and slidably encloses the cylinder 12. The casing 43 is effective to house and protect the cylinder and the piston rod as well as the stand pipe 41. The stand pipe 41 is preferably carried by the casing 43 and its upper end is preferably threaded to the casing, as designated at 46. The cylinder 12 below the piston 25 is preferably partially filled with oil, designated at 47, in Figure 2.

In operation it will be understood that when the spring suspension exercises its cushioning effect on the impact, the shock absorber which constitutes the present invention does not in any way alter or interfere with its cushioning effect. The piston 25 descends freely as the pressure operated valve 35 opens and permits the air to flow above the piston. On the rebound, however, although the valve 38 is open to prevent compression above the piston the pressure closes the valve 35 and as its upward movement is resisted as it tends to produce a rarefaction or vacuum in the lower end of the cylinder and this resistance cushions or dampers the rebound to prevent undesirable shocks. The degree of this rarefaction may be adjusted or varied by the hand-cock 42 which may be manipulated to entirely cut off admission of air below the piston 25 or which may be adjusted to admit a limited amount of air therebelow as desired.

It is to be noted that when the piston 25 descends on impact the elongated tubular valve stem 37 of the valve 35 eventually strikes the lower cylinder head 13 and positively opens the valve 35 to permit the oil 47 to flow above the piston 25. Moreover the valve 35 remains open for a short time during the initial up-stroke or movement of the piston until the piston has lifted the valve stem clear of the lower cylinder head.

I claim:

1. In a shock absorber of the character described, a bracket adapted to be secured to the vehicle body, a bracket adapted to be secured to the axle or the like, a cylinder having a lower cylinder head and an upper cylinder head provided with a piston rod opening and with another opening having a valve seat, means for universally connecting said cylinder to said axle bracket, a piston reciprocable in said cylinder and having an opening therethrough provided with a valve seat, a piston rod for the piston, means for universally connecting the piston rod to the vehicle body bracket, a pressure operated valve cooperable with the valve seat of the piston and provided with an opening and having an elongated tubular valve stem adapted to coact with the lower head of the cylinder to positively operate said valve, a second pressure operated valve cooperable with the valve seat of the upper cylinder head and having an opening therethrough and a tubular valve stem, a stand pipe extending through the openings of said valves and their tubular valve stems to the atmosphere, a hand cock controlling said stand pipe, and a cylindrical casing having a closed end secured to the piston rod at its upper end slidably enclosing said cylinder.

2. In a shock absorber of the character described, a bracket adapted to be secured to the vehicle body, a bracket adapted to be secured to the axle, a cylinder having a lower cylinder head and an upper cylinder head provided with a piston rod opening and with another opening having a valve seat, means for universally connecting said cylinder to said axle bracket, a piston reciprocable in said cylinder and having an opening therethrough provided with a valve seat, a piston rod for the piston, means for universally connecting the piston rod to the vehicle body bracket, a pressure operated valve cooperable with the valve seat of the piston and provided with an opening and having an elongated tubular valve stem adapted to coact with the lower head of the cylinder to positively operate said valve, a second pressure operated valve cooperable with the valve seat of the upper cylinder head and having an opening therethrough and a tubular valve stem, a stand pipe extending through the opening of said valves and their tubular valve stems to the atmosphere, and a hand-cock controlling said stand pipe.

3. In a shock absorber of the character described, a cylinder having a lower cylinder head and an upper cylinder head provided with a piston rod opening and another opening having a valve seat, a piston reciprocable in said cylinder and having an opening therethrough provided with a valve seat, a piston rod connected with said piston and operating through the piston rod opening of the upper cylinder head, a pressure operable valve cooperable with the valve seat of the piston and provided with an opening and having an elongated tubular valve stem adapted to coact with the lower head of the cylinder to positively operate said valve, a second pressure valve cooperating with the valve seat of the upper head and having openings therethrough and a tubular valve stem, a standpipe extending through the openings of said valve and their tubular valve stems to the atmosphere, a hand cock controlling said stand pipe and a cylindrical casing having a closed end secured to the piston rod at its upper end and slidably enclosing said cylinder.

4. In a shock absorber of the character described, a cylinder having a lower cylinder head and an upper cylinder head provided with an opening having a valve seat, a piston reciprocable in said cylinder and having an opening therethrough provided with a valve seat, a pressure operated valve cooperable with the valve seat of the piston and provided with an opening and having an elongated tubular valve stem adapted to coact with the lower head of the cylinder to positively operate said valve, a second pressure operated valve cooperable with the valve seat of the upper head and having an opening therethrough and a tubular valve stem, a stand pipe extending through the openings of said valves and their tubular valve stems to the atmosphere, and means for controlling the communication of said stand pipe with the atmosphere.

5. In a shock absorber of the character described, a cylinder having a lower cylinder head and an upper cylinder head provided with an opening having a valve seat, a piston reciprocable in said cylinder and having an opening therethrough provided with a valve seat, a pressure operated valve cooperable with the valve seat of the piston and having an elongated valve stem adapted to coact with the lower head of the cylinder to positively operate said valve and a second pressure operated valve cooperable with the valve seat of the upper cylinder head.

6. In a shock absorber of the character described, a cylinder having a lower cylinder head and an upper cylinder head provided with an opening therethrough having a valve seat, a piston reciprocable in said cylinder and having an opening therethrough provided with a valve seat, a pressure operated valve cooperable with the valve seat of the cylinder head and a pressure valve cooperable with the valve seat of the piston.

7. In a shock absorber of the character described, a cylinder, a piston reciprocable in said cylinder and having an opening therethrough provided with a valve seat, a pressure operated valve cooperable with the valve seat, a stand pipe extending through said pressure operated valve, and means for controlling communication of said stand pipe with the atmosphere.

EMMETT SYLVESTER LEHR.